United States Patent [19]

Eichenberger

[11] 4,159,038
[45] Jun. 26, 1979

[54] FOLDING EARTHWORKING IMPLEMENT AND STOPS THEREFORE

[75] Inventor: Weldon N. Eichenberger, Bloomfield Hills, Mich.

[73] Assignee: Massey-Ferguson Inc., Detroit, Mich.

[21] Appl. No.: 864,129

[22] Filed: Dec. 23, 1977

[51] Int. Cl.² ............................................. A01B 73/00
[52] U.S. Cl. ...................................... 172/311; 172/501
[58] Field of Search ............... 172/311, 456, 501, 662, 172/583; 56/228, 385; 280/411 R, 411 A

[56] References Cited

U.S. PATENT DOCUMENTS

| 3,321,028 | 5/1967 | Groenke | 172/311 |
|---|---|---|---|
| 3,692,121 | 9/1972 | Kenney | 172/456 |
| 3,811,516 | 5/1974 | Thompson et al. | 172/311 |
| 3,828,860 | 8/1974 | Poland | 172/311 |
| 3,948,327 | 4/1976 | Parker et al. | 172/311 |
| 4,047,575 | 9/1977 | Wagner | 172/311 |

Primary Examiner—Richard T. Stouffer
Attorney, Agent, or Firm—Robert L. Farris

[57] ABSTRACT

The earthworking implement has a primary frame section and a wing frame section attached to each side of the primary frame section. A folding mechanism is provided for folding each wing frame section to a transport position. The folding mechanism includes a first arm pivotally attached to the primary frame section. A hydraulic cylinder is attached to the primary frame section and to the first arm for pivoting the first arm relative to the primary frame section. A second arm is attached to the first arm and to the wing frame section. The connection between the first arm and the second arm is a lost motion connection. The first arm has a stop which engages the primary frame section and a stop which engages the wing frame section when the wing frame section is in the transport position.

7 Claims, 4 Drawing Figures

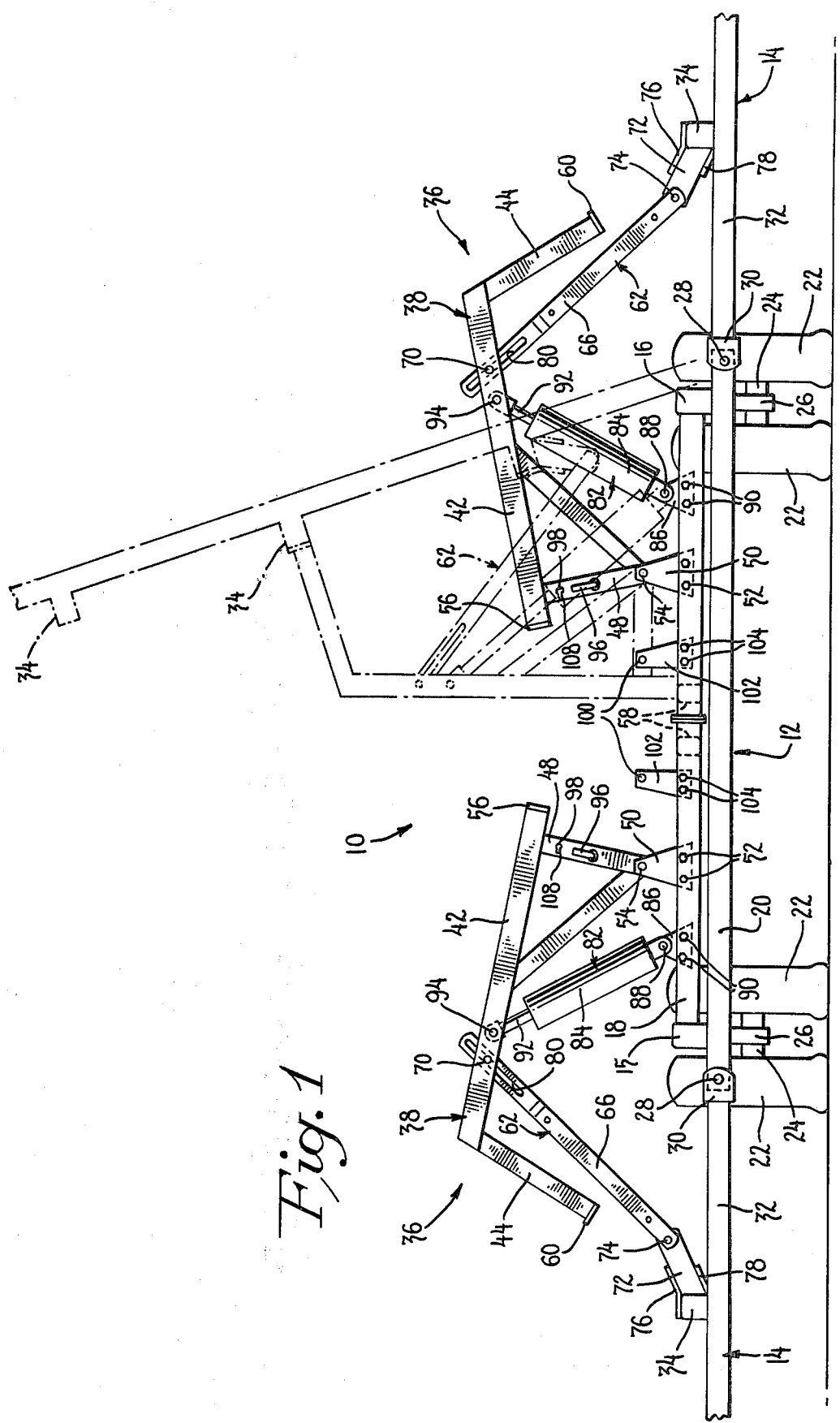

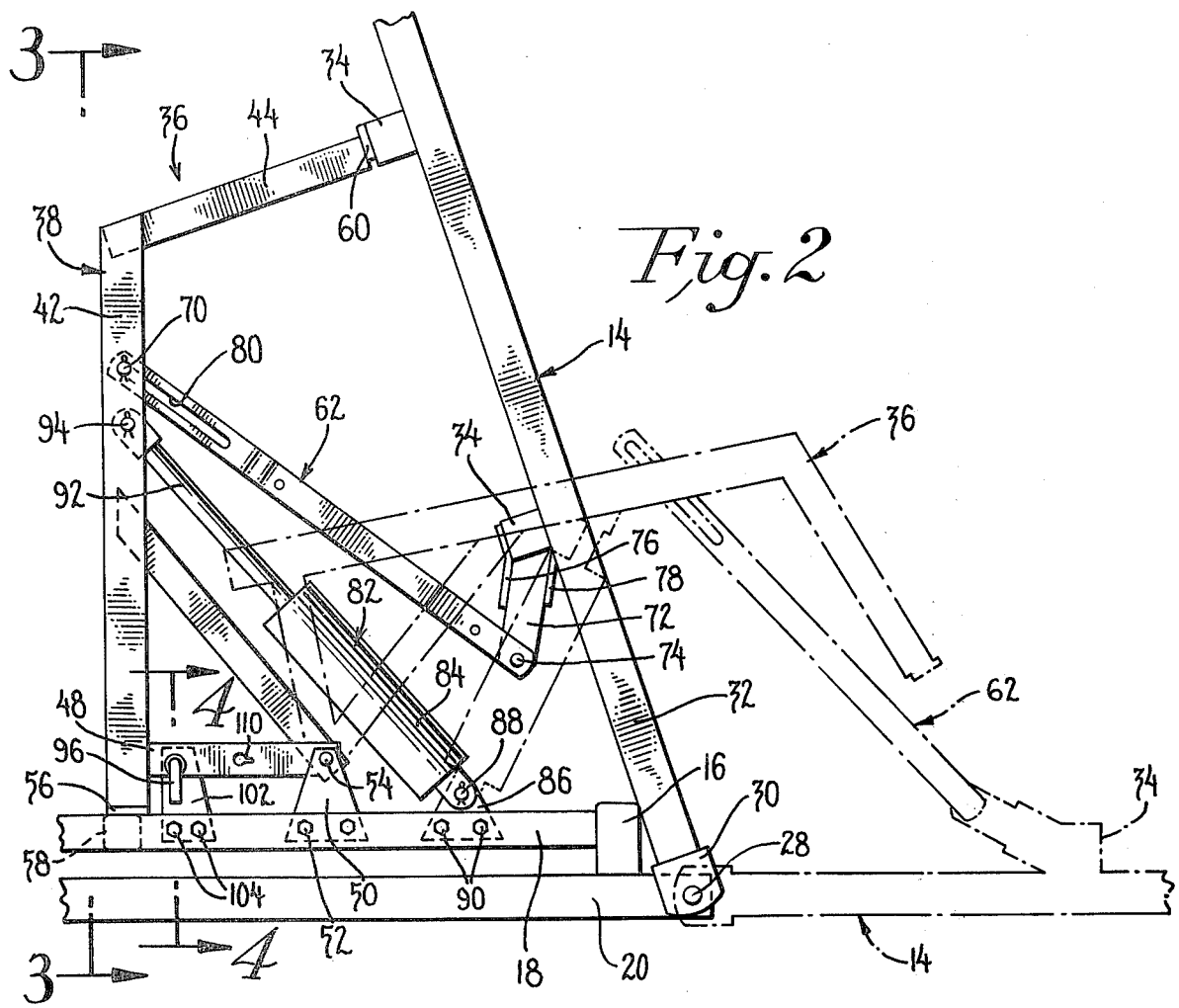
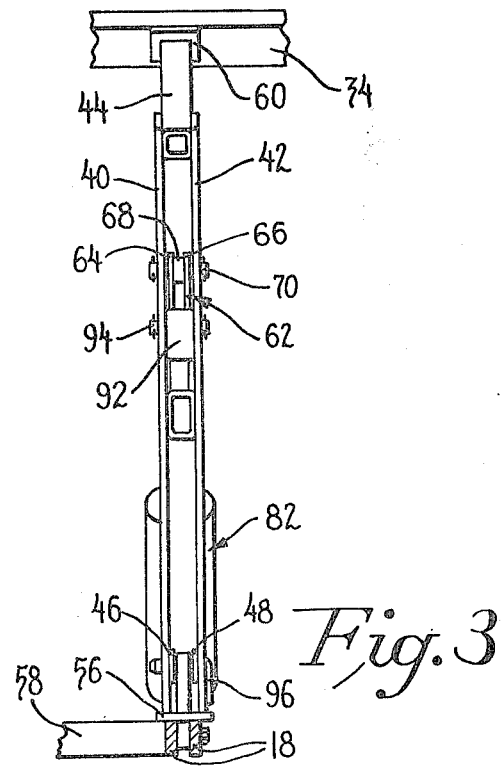
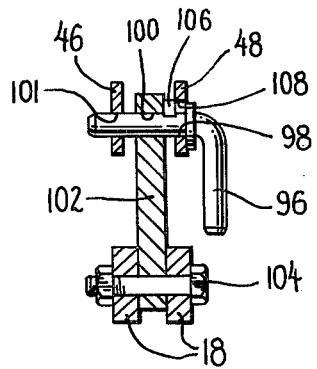

FOLDING EARTHWORKING IMPLEMENT AND STOPS THEREFORE

This invention relates to an agricultural earthworking implement frame with a center frame section supported by transport wheels and wing frame sections pivotally connected to the center section that are foldable into a transport position.

To increase productivity and thereby lower production costs, farmers have moved steadily to larger tractors. Large tractors found on many farms today are capable of pulling implements that work a strip of ground on each pass through a field that is ten meters or more wide. In order to move implements that are over ten meters wide from one field to another, it is necessary to provide an implement frame with wings that will fold to reduce the transport width.

Numerous folding mechanisms have been provided to fold the wings. On all but the smallest implements, a hydraulic cylinder is generally employed for folding each wing. In the transport position, each wing normally rests against a rest stop. The rest stop for these implements is a rigid tower which extends up from the implement frame. These towers are heavy, costly to fabricate, increase the height of the implement in the field, and in some cases, obstruct the tractor operator's view to the rear.

The earthworking implement of this invention includes a primary earthworking tool support frame, with ground engaging wheels. A secondary earthworking tool support frame is pivotally attached to the primary earthworking tool support frame. A folding mechanism is provided for pivoting the secondary earthworking tool support frame from an earthworking position to a transport position. The folding mechanism includes a first arm pivotally attached to the primary earthworking tool support frame. The first arm includes a primary earthworking tool support frame engaging stop and a secondary earthworking tool support frame engaging stop. A second arm is pivotally attached to the secondary earthworking tool support frame and the first arm. A hydraulic cylinder is attached to the implement for pivoting the secondary earthworking tool support frame about its connection to the main earthworking tool support frame to move the main earthworking tool support frame engaging stop on the first arm into contact with the main earthworking tool support frame and to move the secondary earthworking tool support frame engaging stop on the first arm into contact with the secondary earthworking tool support frame. The hydraulic cylinder is also operable to move both stops out of contact with the respective frames.

FIG. 1 is a rear elevation of an improved earthworking implement including a primary earthworking tool support frame and portions of two secondary earthworking tool support frames;

FIG. 2 is an enlarged view of one of the folding mechanisms with integral stops;

FIG. 3 is a sectional view of the folding mechanism taken along lines 3—3 of FIG. 2; and FIG. 4 is an enlarged sectional view of the transport safety lock taken along lines 4—4 of FIG. 2.

The earthworking implement 10 as shown in FIG. 1 includes a primary earthworking tool support frame 12 and a pair of secondary earthworking tool support frames 14. The primary earthworking tool support frame 12 includes fore and aft frame members 15 and 16. Cross frame members 18 and 20 are rigidly secured to the fore and aft frame members 15 and 16. Earthworking tools (not shown) such as disc harrow gangs and tines for chisel plows attach to the cross frame members 20. The number and arrangement of the cross frame members 20 depends upon the type of earthworking tools employed.

Transport wheels 22, for supporting the primary earthworking tool support frame 12, are rotatably journaled on axles 24. The axles 24 are secured to the free ends of wheel support arms 26. The wheel support arms 26 are both secured to a rock shaft that is pivotally secured to the fore and aft frame members 15 and 16 in front of the cross frame member 20. A hydraulic cylinder (not shown) may be provided to rotate the rock shaft to move the transport wheels 22 vertically relative to the fore and aft frame members 15, 16. The transport wheels 22 can thereby be positioned to hold the primary earthworking tool support frame in a raised transport position. If required, the transport wheels 22 can also be used as gauge wheels to control the depth at which earthworking tools penetrate the ground.

A secondary earthworking tool support frame 14 is pivotally attached to each side of primary earthworking tool support frame 12 by pivot pins 28. The pivot pins 28 pass through plates 30 welded to the ends of the cross frame members 32 and through apertures in the ends of the cross frame members 20. Fore and aft frame members 34 are welded to the cross frame members 32 of each secondary earthworking tool support frame 14. Only the inner ends of the secondary earthworking tool support frames 14 are shown in the drawings. Each secondary earthworking tool support frame 14 would include at least two fore and aft frame members 34.

A gauge wheel (not shown) would normally be mounted on the outboard end of each secondary earthworking tool support frame 14. The gauge wheel would be vertically adjustable relative to the cross frame members 32 to adjust the working depth of the earthworking tools attached to the cross frame members 32. As the earthworking implement moves forward across a field, the gauge wheels on the secondary earthworking tool support frames 14 would raise and lower the outboard end of each secondary earthworking tool support frame 14 due to undulations in the surface of the field. This would result in pivoting the secondary earthworking tool support frames 14 relative to the primary earthworking tool support frame 12 about the generally horizontal fore and aft axis of pivot pins 28.

A folding mechanism 36 is provided to pivot each secondary earthworking tool support frame 14 about the generally horizontal fore and aft axis of the pivot pins 28 relative to the primary earthworking tool support frame 12. In FIG. 1, two folding mechanisms 36 are shown with the secondary earthworking tool support frames 14 in the earthworking position. The right hand side folding mechanism 36 is illustrated by phantom lines in the transport position in FIG. 1. In Fig. 2, the right hand side folding mechanism 36 is illustrated by phantom lines in the earthworking position.

Each folding mechanism 36 includes a first arm assembly 38. The first arm assembly 38 is fabricated from several parts including a pair of spaced main bars 40, 42. A rectangular tube 44 is welded to and extends outwardly at an angle from the outboard ends of the spaced main bars 40, 42. A pair of spaced short bars 46, 48 each have one end welded to the inboard ends on the spaced main bars 40, 42. A rectangular tube brace is welded between the mid portion of the spaced main bars 40, 42 and to the free ends of the pair of spaced short bars 46, 48. Pivot pin 54 pivotally connects the free ends of the spaced short bars 46, 48 to a plate 50 secured to cross frame members 18 by bolts 52. A primary earthworking tool support frame engaging stop 56 is welded to the inboard ends of the spaced main bars 40, 42. In the transport position, the frame engaging stop 56 is in contact with the cross frame members 18 and one of the fore and aft frame members 58 of the primary earthworking tool support frame 12.

A secondary earthworking tool support frame engaging stop 60 is welded to the free end of a rectangular tube 44 on the outboard end of the spaced main bars 40, 42. In the transport position, the frame engaging stop 60 is in contact with one of the fore and aft frame members 34.

Each folding mechanism 36 also includes a second arm assembly 62. The second arm assembly 62 includes a pair of bars 64, 66 with spacers 68 between them. One end of the second arm assembly 62 is pivotally attached to the first arm assembly 38 by a pin 70. The other end of the second arm assembly 62 is pivotally attached to a bracket 72 by a pin 74. The bracket 72 is welded to a fore and aft frame member 34 on the secondary earthworking support frame 14. Plates 76, 78 are welded to the fore and aft frame members 34 and to the bracket 72 to reinforce the bracket 72.

A slot 80 is provided in one end of the second arm assembly 62. The pin 70, for attaching the second arm assembly 62 to the first arm assembly 38, passes through the slot 80. The slot allows the secondary earthworking tool support frame 14 to oscillate about the axis of the pivot pin 28 as the earthworking implement moves across a field when the earthworking implement 10 is in an earthworking position.

A hydraulic cylinder 82 is provided to pivot each secondary earthworking tool support frame 14 between the earthworking position and the transport position. The hydraulic cylinder has its head end 84 pivotally attached to a plate 86 by a pin 88. The plate 86 is secured to cross frame members 18 on the primary earthworking tool support frame 12 by bolts 90. The piston rod 92 of the hydraulic cylinder 82 is pivotally attached to the first arm assembly 38 of the folding mechanism by a pin 94.

A locking pin 96 is provided for locking the secondary earthworking tool support frame 14 in a transport position. The locking pin 96 is inserted through an aperture 98 in the spaced short bar 48, an aperture 100 in the plate 102 and through an aperture 101 in the spaced short bar 46. The plate 102 is secured to cross frame members 18 by bolts 104. A stud 106, which protrudes from the locking pin 96, passes through a slot 108 in the side of the aperture 98 when the locking pin 96 is inserted. Rotation of the locking pin 96 after insertion moves the stud 106 behind the spaced short bar 48 and holds the locking pin 96 in the apertures 98, 100, 101 until the stud 106 is again aligned with the slot 108. A sloted aperture 110 through the spaced short bars 46, 48 is provided for storage of the locking pin 96 when the locking pin 96 is not retaining the secondary earthworking tool support frame 14 in the transport position.

In operation, the piston rod 92 is forced from the head end 84 of the hydraulic cylinder 82 to pivot the secondary earthworking tool support frame 14 about the axis of pivot pins 28 to a transport position. The hydraulic cylinder 82 pivots the first arm assembly 38 of the folding mechanism 36 about the axis of the pivot pin 54 until the frame engaging stop 56 is in contact with the cross frame members 18 and one of the fore and aft frame members 58. When the frame engaging stop 56 contacts the cross frame members 18, the frame engaging stop 60 will be in contact with one of the fore and aft frame members 34 on the secondary earthworking tool support frame 14. The locking pin 96 is inserted through the apertures 98, 100, 101, to lock the secondary earthworking tool support frame 14 in the transport position. As shown in FIG. 2, the center of gravity of the secondary earthworking tool is to the left of the pivot pin 28. The locking pin 96 is therefore merely a safety device.

To lower the secondary earthworking tool support frame 14 to the working position, the locking pin 96 is removed from the apertures 98, 100, 101, and inserted into the sloted aperture 110 for storage. The piston rod 92 in the hydraulic cylinder 82 is then retracted. Retracting the piston rod 92 pivots the first arm assembly 38 of the folding mechanism 36 about the axis of the pivot pin 54 in a clockwise direction as shown in FIG. 2. The frame engaging stop 60 pushes the secondary earthworking tool support frame 14 until its center of gravity passes to the right of the pivot pin 28 as shown in FIG. 2. After the center of gravity passes to the right of the pivot pin 28, the second arm assembly 62 becomes a tension link and the hydraulic cylinder 82 lowers the secondary earthworking tool support frame 14 gently to the earthworking position. At the time the center of gravity of the secondary earthworking tool support frame 14 passes to the right of the pivot pin 28, the pin 70 is at the end of the slot 80 in the second arm assembly 62 remote from the pin 74. There is essentially no free movement. The secondary earthworking tool support frame 14 is substantially positively controlled by the hydraulic cylinder 82 at all times, except when the secondary earthworking tool support frame 14 is in the earthworking position.

I claim:

1. An improved earthworking implement including a primary earthworking tool support frame, ground engaging wheels rotatably journaled on the primary earthworking tool support frame, at least one secondary earthworking tool support frame pivotally connected to the primary earthworking tool support frame and a folding mechanism characterized by a first arm, pin means pivotally attaching the first arm to the primary earthworking tool support frame, a primary earthworking tool support frame engaging stop on the first arm, a secondary earthworking tool support frame engaging stop on the first arm, said secondary earthworking tool support frame engaging stop coming into contact with the secondary earthworking tool support frame at substantially the same time the primary earthworking tool support frame engaging stop comes into contact with the primary earthworking tool support frame, a second arm, pin means pivotally attaching the second arm to the secondary earthworking tool support frame, pin means pivotally attaching the second arm to the first arm, and a hydraulic cylinder, attached to the earthworking implement that is capable of pivoting the secondary earthworking tool support frame about its connection to the main earthworking tool support frame to move the main earthworking tool support frame engaging stop on the first arm into contact with the primary earthworking tool support frame and to simultaneously move the secondary earthworking tool support frame engaging stop on the first arm into contact with the secondary earthworking tool support frame.

2. The improved earthworking implement of claim 1 characterized by the hydraulic cylinder having one end connected to the primary earthworking tool support frame by a pivot pin and the other end connected to the first arm by a pivot pin.

3. The improved earthworking implement of claim 1 characterized by the second arm including a lost motion connection.

4. The improved earthworking implement of claim 1 characterized by the second arm including an elongated slot and the pin means pivotally attaching the second arm to the first arm passing through the slot.

5. The improved earthworking implement of claim 4 characterized by the hydraulic cylinder having one end connected to the primary earthworking tool support frame by a pivot pin and the other end connected to the first arm by a pivot pin.

6. The improved earthworking implement of claim 1 characterized by at least one secondary earthworking tool support frame pivotally connected to each side of the primary earthworking tool support frame and a folding mechanism connected to each secondary earthworking tool support frame.

7. The improved earthworking implement of claim 1 characterized by the secondary earthworking tool support frame being pivotally connected to the primary earthworking tool support frame by pivot pins having generally horizontal fore and aft extending axes.

* * * * *